United States Patent
Wylie et al.

[11] Patent Number: 5,974,329
[45] Date of Patent: Oct. 26, 1999

[54] METHOD AND SYSTEM FOR MOBILE LOCATION ESTIMATION

[75] Inventors: Marilynn P. Wylie, Philadelphia, Pa.; Jack M. Holtzman, Westfield, N.J.

[73] Assignee: Rutgers University, Piscataway, N.J.

[21] Appl. No.: 08/939,418

[22] Filed: Sep. 29, 1997

[51] Int. Cl.[6] .................................................. H04Q 7/20
[52] U.S. Cl. .................. 455/456; 455/457; 455/67.7; 342/457
[58] Field of Search .................................. 455/456, 457, 455/524, 517, 67.6, 67.4, 63, 62; 342/457, 458

[56] References Cited

U.S. PATENT DOCUMENTS

| | | | |
|---|---|---|---|
| 4,954,837 | 9/1990 | Baird et al. | 342/458 |
| 5,257,405 | 10/1993 | Reitbrger | 455/514 |
| 5,293,642 | 3/1994 | Lo | 455/456 |
| 5,293,645 | 3/1994 | Sood | 455/67.6 |
| 5,327,144 | 7/1994 | Stilp et al. . | |
| 5,365,516 | 11/1994 | Jandrell | 370/18 |
| 5,390,124 | 2/1995 | Kyrtsos . | |
| 5,629,707 | 5/1997 | Heuvel et al. . | |

OTHER PUBLICATIONS

Radio Location in Urban CDMA Microcells ,@ 1995 IEEE, Caddery et al, Jan. 1995
Mobile Station Location III GSM, @ Nov. 1995, Silventoinen et al , IEEE Wireless comm. systems, Nov. 1995.
Moble Station Emergency Locating in GSM , Silventoinen et al , IEEE international conference on peresonal wireless comm., Feb. 1996.
Outdoor Microcell Measurements at 1700 MHZ, Olsson et al , Dept, of Applied Electrical Lund Univ., Feb. 1992.
Measurement of the Indoor RF Propagation Channel at KU Frequency Band , IEEE, Apr. 1993.
Estimation of Signal Strength Characterstics in Typical Microcell Enviroments for PCN Network, IEEE, Aug. 1993.
M.I. Silventoinen et al., "Mobile Station Locating in GSM", *IEEE Wireless Communication System Symposium,* Long Island, NY, Nov. 1995.
J.L. Caffrey et al. "Radio Location in Urban CDMA Microcells", *Proceedings of the Personal, Indoor and Mobile Locaiton Environment,* 1995.
T.S. Rappaport et al, "Position Location Using Wireless Communication On Highways of the Future", *IEEE Communications Magazine,* Oct. 1996.
M.I. Silvenstoinen, et al. "Anytime, anywhere . . . Big Brother is Watching You", Mobile Europe, Sep. 1995, pp. 43–50.
M.I. Silvenstoinen, et al. "Mobile Station Emergency Locating in GSM", IEEE International Conference on Personal Wireless Communications, India, Feb. 1996.

*Primary Examiner*—Edward F. Urban
*Assistant Examiner*—Tilahun Gesesse
*Attorney, Agent, or Firm*—Mathews, Collins, Shepherd & Gould, P.A.

[57] ABSTRACT

The present invention relates to a method and system for mobile location estimation in which range measurements between the mobile station and a base station are discriminated as being either from a base station which is line of sight with the mobile station or a base station that is non-line of sight with the mobile station. Non-line of sight error present in range measurements from base stations that are non-line of sight with the mobile station is corrected. A reconstructed line of sight range measurement is established from the correction of the non-line of sight error. The reconstructed line of sight range measurement can be used with range measurements of base stations determined to be line of sight for accurately locating the mobile station.

18 Claims, 10 Drawing Sheets

METHOD AND SYSTEM FOR MOBILE LOCATION ESTIMATION

BACKGROUND OF THE INVENTION

1. Field of the Invention

The present invention relates to a method and system for mobile station location estimation in which base stations that are in line of sight of the mobile station and base stations that are not in the line of sight of the base station can be determined. Errors in base station signals generated from determined non-line of sight base stations are reduced for providing improved mobile station location estimation.

2. Description of the Related Art

Mobile location estimation determines a geographical estimate of the location of a mobile station. Mobile location estimation is useful in management of fleets of mobile stations, location dependent information services, location dependent billing services and Emergency 911 location of a mobile station. Enhanced 911 is designed to automatically forward the number of a caller to a public safety answering point (PSAP). In implementing enhanced 911 in a wireless network, wireless service providers provide two dimensional location of the vehicle to the public safety answering point (PSAP). The Federal Communications Commission (FCC) has regulated by the year 2001 that wireless service providers have the capability of locating callers in two dimensions within 125 meters 67% of the time.

One conventional method for locating a mobile station in two dimensions would use the measurement of the line of sight distance between the mobile station and at least three base stations. U.S. Pat. No. 5,365,516 describes a method for determining the location of a transponder unit in which a radio signal is sent by the mobile station. The arrival time of the radio signal is measured at each of three base stations. Each distance measurement between the mobile station and one of the base stations can be used to generate a circle which is centered at the measuring base station. The circle has a radius which is equal to the distance between the mobile station and the base station. Accordingly, three circles are generated, one for each of the base stations. In the absence of any measurement error of the distance between the base stations and the mobile station, the intersection of the three circles unambiguously determines the location of the mobile station. This method has the drawback that the distance measurements can be corrupted by noise resulting in errors in determining the location of the mobile station.

A conventional solution for providing more accurate position estimates is to reduce the error due to noise with a least squares analysis. Accordingly, the least squares analysis provides a more accurate position estimate. This solution has the limitation of not accounting for the possibility of a lack of a direct path between the base station and the mobile station. For example, in an urban environment, a building or buildings may be in the path between the mobile station and the base station. A propagating signal between the mobile station and the base station can be reflected and defracted by the object in the path of the mobile station to the base station resulting in the signal traveling excess path lengths. The excess path lengths can be on the order of a hundred meters.

The lack of direct path between the mobile station and the base station can be defined as a non-line of sight (NLOS). The importance of detecting and reducing the NLOS measurements between a mobile station and a base station is recognized in M.I. Silventoinen, et al., "Mobile Station Locating in GSM" *IEEE Wireless Communication System Symposium,* Long Island N.Y., November 1995 and J. L. Caffrey et al., "Radio Location in Urban CDMA Microcells", *Proceedings of the Personal, Indoor and Mobile Radio Environment,* 1995.

U.S. Pat. No. 5,365,516 ('516 patent) describes an embodiment of a transreceiver locating system operating in an environment susceptible to multipath interference. The system includes a transponder which is operable within a prescribed coverage area to transmit a burst of data symbols in a coded carrier pulse. Each base station includes a receiver for detecting and responding to the data symbol at a given time, interrupting the data symbol and rejecting echoes resulting from multipath interference. A comparison circuit responds to the receiver for comparing respectively identified given times and decorrelating the time difference to improve data quality. Although the '516 patent addresses multipath interference, it does not attempt to detect base stations for reducing multipath NLOS with mobile stations.

It is desirable to provide a method and system for providing improved mobile location estimation which is robust to NLOS error.

SUMMARY OF THE INVENTION

Briefly described, the present invention relates to a method and a system for mobile location estimation in which base stations are identified to be either line of sight (LOS) or non-line of sight (NLOS) with a mobile station. A range measurement is determined as the distance between the base station and the mobile station. NLOS ranging error is corrected for base stations identified to be NLOS with the mobile station by reconstructing the LOS measurement. From the range measurements of base stations identified as LOS and the reconstructed LOS range measurements the location of the mobile station is estimated.

The base station can be identified as being NLOS by comparing the standard deviation of standard measurement noise from the environment to the standard deviation of a smoothed range measurement obtained from the range measurements between the base station and mobile station. The smoothed range measurement can be obtained using an $N^{th}$ order polynomial fit. It has been found that when the standard deviation of the smoothed range measurement is on the order of the standard deviation of the standard measurement noise, the base station corresponds to an LOS environment and when the standard deviation of the smoothed range measurement is greater than the standard deviation due to standard measurement noise, the base station corresponds to an NLOS environment. Alternatively, the residuals from a least squares analysis can be used to determine the presence of NLOS range measurements.

NLOS error can be corrected when the standard measurement noise dominates the NLOS error and there is predetermined identification of the approximate support of the standard measurement noise over the real axis. A reconstructed LOS range measurement can be determined by graphing a curve of the smoothed range measurements. The point of maximum deviation of the smoothed range measurement below the curve is determined. The curve is displaced downwards to pass through the point of maximum deviation. Thereafter, the curve is displaced upwards by the value of the maximum standard measurement noise deviation from an LOS measurement with negligible noise, thereby providing a reconstructed range measurement.

The mobile location estimation can be determined using at least three range measurements between LOS base stations and the mobile station or reconstructed LOS range measurements in a multilateration analysis. In this analysis, a circle is generated from each range measurement. The circle is centered at the base station and the range measurement is the radius of the circle. The estimated intersection of the three circles determines the location of the mobile station. Alternatively, two range measurements and information directed to the position angle of the mobile station can be used for estimating the location of the mobile station.

The present invention has the advantages of accurately determining the location of a mobile station by reducing NLOS error. In addition, the present invention can provide confidence in an LOS environment that all base stations are LOS with the mobile station. Results indicate that position range bias due to NLOS error can be reduced several orders of magnitude with the method of the present invention.

The present invention will be more fully described by reference to the following drawings.

DETAILED DESCRIPTION OF THE PRESENT INVENTION

During the course of this description like numbers will be used to identify like elements according to the different figures which illustrate the invention.

Figure 1A:
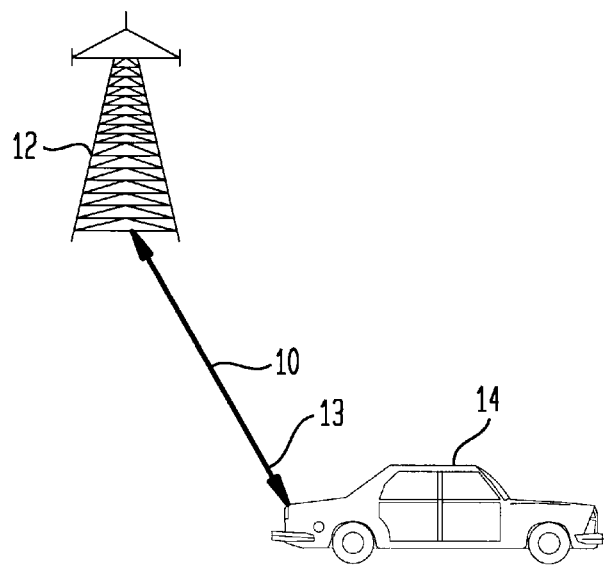
FIG. 1A is a schematic diagram of an environment in which there is an unobstructed line of sight radio signal path between a mobile station and a base station.
Figure 1B:
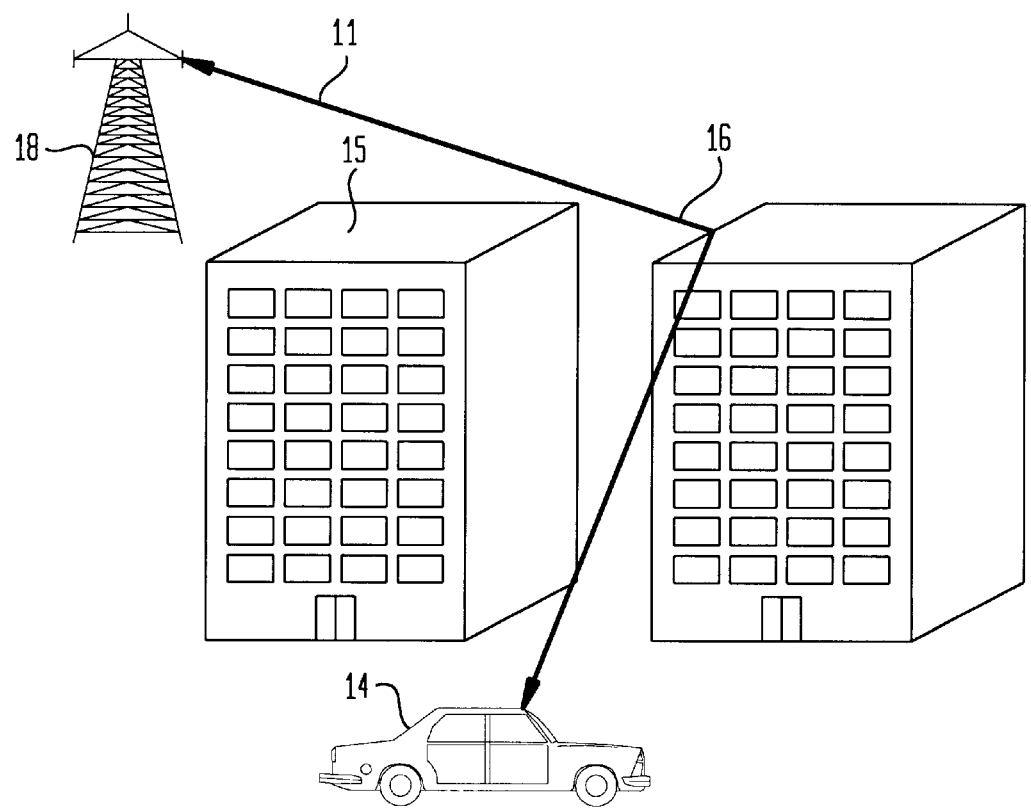
FIG. 1B is a schematic diagram of an environment in which there is a non-line sight radio signal path between a mobile station and a base station.

FIG. 1A illustrates a schematic diagram of a line of sight (LOS) path 10 between a base station 12 and mobile station 14. Signal 13 can be transmitted from base station 12 to mobile station 14 and returned from mobile station 14 to base station 12. FIG. 1B illustrates a schematic non-line of sight (NLOS) path 11 between base station 12 and mobile station 14. Building 15 is positioned between base station 12 and mobile station 14 resulting in reflection of signal 16. For example, signal 13 and signal 16 can be a radio signal.

A range measurement for measuring the distance between base station 12 and mobile station 14 can be measured as the time it takes a signal sent between base station 12 and mobile station 14:

$$r = cT \qquad (1)$$

in which the mobile station to base station range measurement is represented by r, c represents the speed of light which is the same speed as the propagation of radio waves and T represents the one-way travel time of the signal. A range measurement of the distance between mobile station 14 and base station 12 in FIG. 1A and 1B can be determined using equation (1) based on travel time of signal 13 and signal 16, respectively, between base station 12 and mobile station 14. The value of r generated from signal 16 is greater than the value of r generated for signal 13.

Figure 2:
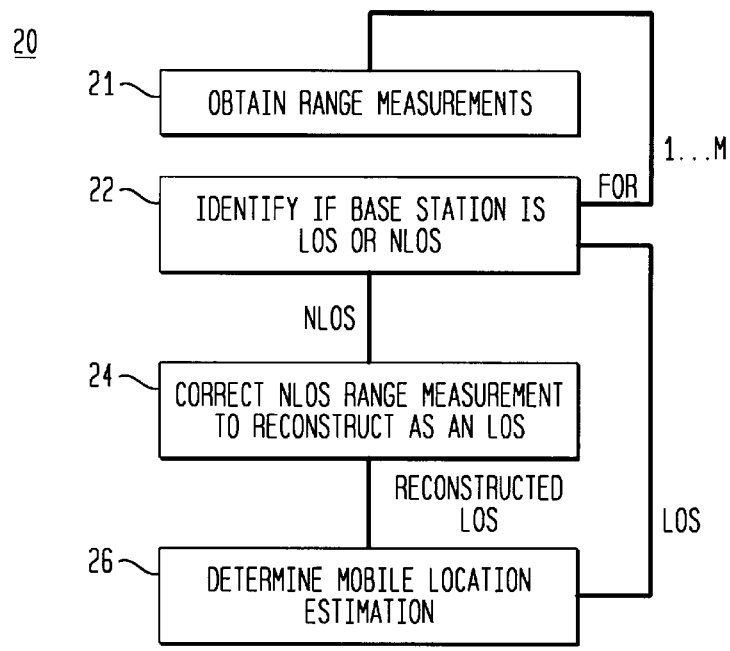
FIG. 2 is a flow diagram of the system and method for mobile location estimation in accordance with the teachings of the present invention.

FIG. 2 is a flow diagram of the system and method of the present invention for mobile location estimation 20. In block 21, a range measurement is obtained between mobile station 14 and base station 12 using equation (1). In block 22, base station 12 is identified as being in line of sight (LOS) or non-line of sight (NLOS) with mobile station 14. Block 22 is repeated for a plurality of base stations 12 positioned at different locations from mobile station 14. If base station 12 is identified to be LOS in block 22, the range measurement obtained from block 21 is forwarded to block 26. If base station 12 is identified to be NLOS in block 22, block 24 is implemented for reducing the error of the range measurement between base station 12 and mobile station 14, thereby rendering the range measurement between base station 12 and mobile station 14 as a reconstructed LOS base station 13, as shown in FIG. 3.

Figure 3:
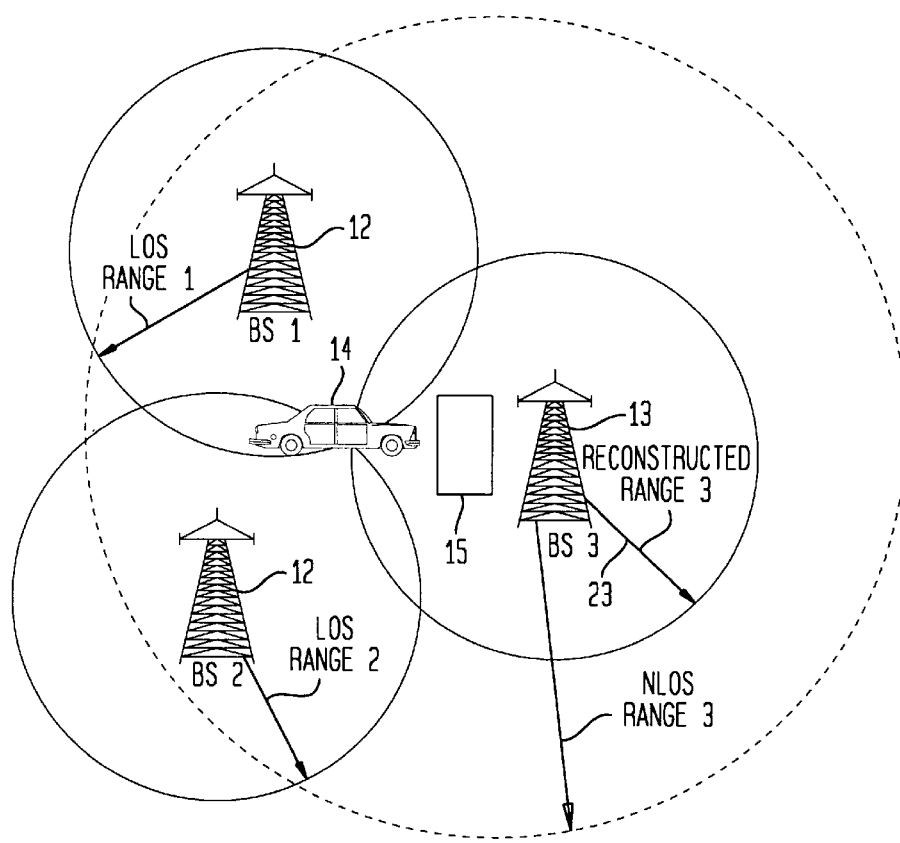
FIG. 3 is a schematic diagram of distance measurements of a reconstructed line of sight base station and determined line of sight base stations.

In FIG. 3, base station 12 labeled BS1 has a range measurement labeled LOS RANGE 1 determined to be LOS. Base station 12 labeled BS2 has a range measurement labeled LOS RANGE 2 determined to be LOS. Base station 13 labeled BS3 has a range measurement labeled NLOS RANGE 3 determined to be NLOS. A range measurement for the reconstructed LOS base station labeled RECONSTRUCTED RANGE 3 is forwarded to block 26. Range measurements from determined LOS base stations from block 22 labeled LOS RANGE 1, and LOS RANGE 2 are also forwarded to block 26. From the range measurements of the reconstructed LOS base stations or the determined LOS base stations, or a combination of range measurements of the reconstructed LOS the mobile location estimation can be identified using a conventional multilateration technique, such as described in U.S. Pat. No. 5,365,516, hereby incorporated by reference into this application. Alternatively, the mobile location estimation can be determined from time difference of arrival time measurements as the difference of propagation delays between the mobile station 14 and pairs of base stations 12. In this case, the position estimate is at the intersection of hyperbolas. The number of base stations can be reduced below three if there is also angle of arrival information. These methods are described in T. S. Rappaport et al., "Position Location Using Wireless Communication On Highways Of the Future", *IEEE Communications Magazine*, October 1996.

Figure 4:
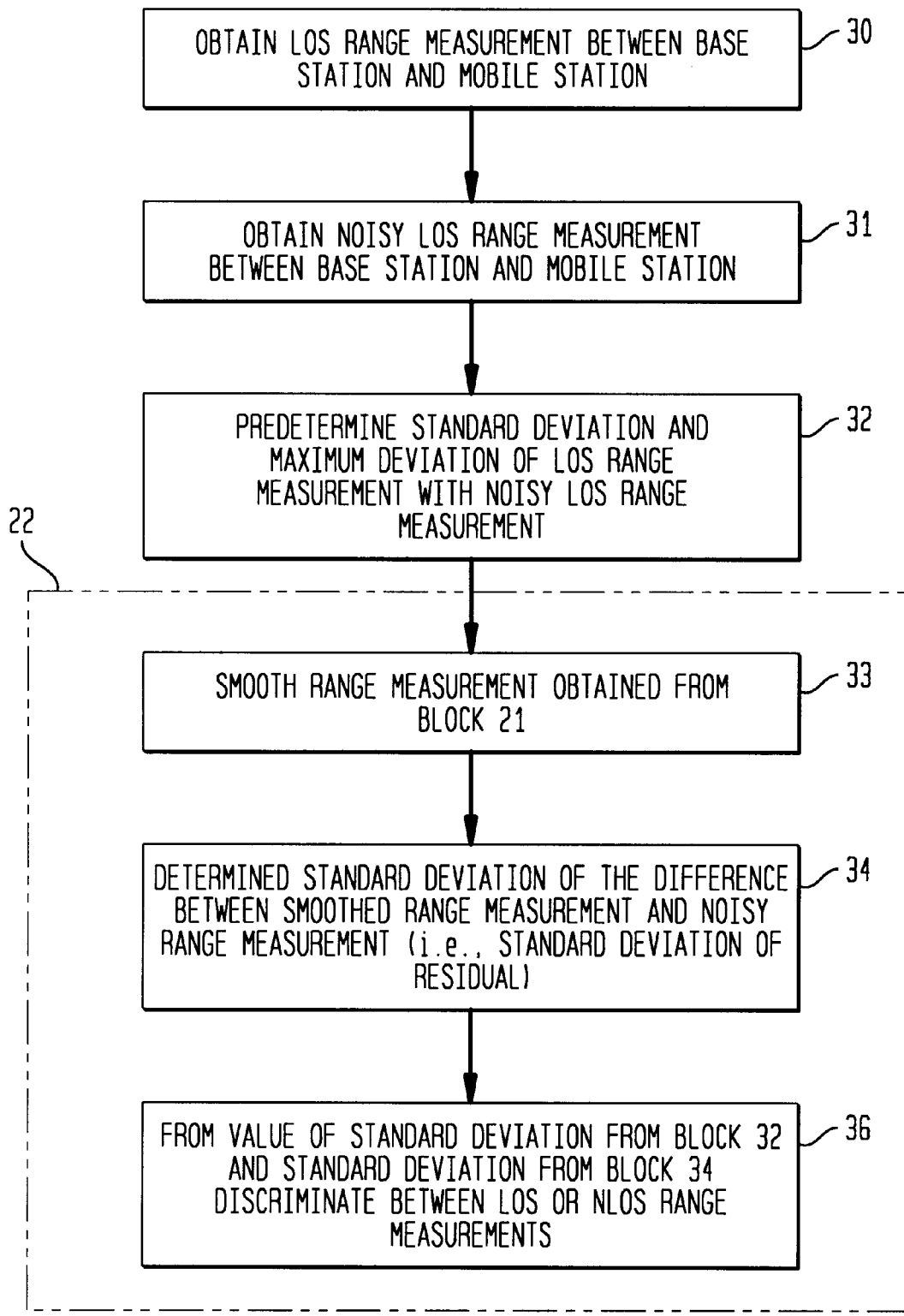
FIG. 4 is a flow diagram of a method for identifying non-line of sight base stations of the present invention.

One method for identifying if a base station is LOS or NLOS in block 22 is illustrated in FIG. 4. In this method, the time history of range measurements between base station 12 and mobile station 14 is combined with predetermined standard deviation from conventional measurement noise in a radio signal environment.

The arrival time of signals sent from base station 12 to a mobile station 14 and transponded back to the base station 12 can be converted to a range measurement, in block 30. The range measurement at the $m^{th}$ base station at time $t_k$ can be represented as:

$$r_m(t_i) = L_m(t_i) + n_m(t_i) + NLOS_m(t_i) \quad (2)$$

for $m=1, \ldots, M$ $i=0, \ldots K-1$, wherein $Lm(t_i)$ is the LOS distance between a mobile station and the $m^{th}$ base station in two dimensions which is given by:

$$L_m(t_i) = |x(t_i) + j^*y(t_i) - X_m - j^*Y_m|; \quad (3)$$

$x(t_i)$, $y(t_i)$ and $(x_m, y_m)$ are respectively the coordinates of the mobile station at time, $t_i$, and those of the $m^{th}$ base station; $n_m(t_i)$ represents conventional measurement noise such as additive white Gaussian measurement noise and $NLOS_m(t_i)$ represents NLOS measurement error at time $t_i$; and M is the total number of base stations; and K is the total number of time samples.

In block 30, an LOS range measurement with negligible noise is obtained for base station 12 in LOS with mobile station 14. The LOS range measurement can be obtained by physically measuring a range between base station 12 and mobile station 14 or can be obtained as a range measurement determined by equation (1) in a negligible noise environment. In block 31, a noisy range measurement is determined as a range measurement which is LOS with a base station taken in a noisy environment. In block 32, the standard deviation of the noisy range measurement from the LOS measurement without noise is determined. Blocks 30, 31 and 32 can be predetermined before identifying base station 12 as either LOS or NLOS in block 22. The standard deviation due to noise $n_m(t)$ can be represented by $\sigma_m$.

In block 33, the range measurement obtained from block 21 is smoothed by modeling $$r_m(t_i) = \sum_{n=0}^{N-1} a_m(n) t_i^n \quad (4)$$

and solving for the unknown coefficients, $\{a_m(n)\}_{n=0}^{N-1}$ with a least squares technique. The smoothed range measurement can be represented as:

$$s_m(t_i) = \sum_{n=0}^{N-1} \hat{a}_m(n) t_i^n. \quad (5)$$

In block 34, the standard deviation of the smoothed range measurement from a noisy range measurement (i.e., the residual) is determined. The standard deviation of the residual from block 34 can be represented as $\hat{\sigma}_m$ since $\sigma^2_m = E\{n^2_m(t)\}$. The smoothed range measurements along with the noisy range measurement can be used to determine standard deviation $\hat{\sigma}_m$ with the formulation of:

$$\hat{\sigma}_m = \sqrt{\frac{1}{K} \sum_{i=0}^{K-1} (s_m(t_i) - r_m(t_i))^2} \quad (6)$$

From the value of the standard deviation, $\hat{\sigma}_m$ and the standard deviation $\sigma_m$, the range measurement can be determined as either the result of base station 12 being LOS or NLOS, in block 36. When the range measurement has NLOS error, the value of the standard deviation $\hat{\sigma}_m$ is significantly larger than the value of the standard deviation $\sigma_m$. Accordingly, range measurement for base station 12 that is NLOS with mobile station 14 is determined when the $\hat{\sigma}_m$ is greater than the standard deviation $\sigma_m$. A range measurement of base station 12 that is LOS with mobile station 14 is determined when the standard deviation $\hat{\sigma}_m$ is on the order of the standard deviation $\sigma_m$.

Alternatively, a residual analysis ranking method can be used to identify a range measurement as being from a base station 13 NLOS with mobile station 14. Range measurements between mobile station 12 and base station 14 which have been obtained in block 21 are inputted to block 40. At each instance of time $t_i$, estimated coordinates $\hat{X}_{LS}(t_i), \hat{Y}_{LS}(t_i)$ of mobile station 14 are determined as least squares estimates in block 41. The estimated coordinates $\hat{X}_{LS}(t_i), \hat{Y}_{LS}(t_i))$ are selected to minimize the formulation:

$$F_i = \sum_{m=1}^{M} (r_m(t_i) - \hat{L}_m(t_i))^2 \quad (7)$$

where $\hat{L}_m(t_i) = |\hat{X}(t_i) - x_m + j^*\hat{y}(t_i) - j^*Y_m|$.

In block 41, a calculated range measurement is determined from the estimated coordinates. In block 42, a residual difference of the range measurement between mobile station 12 and base station 14 with the calculated range measurement is determined. The residual difference can be represented as:

$$e_m(t_i) = r_m(t_i) - \hat{L}_m(t_i) \quad (8)$$

In block 44, the number of times the residual difference of a range measurement to a base station 12 has the largest value in comparison to the residual difference determined for range measurements at other base stations is counted for each time instant $t_i$. It has been found that base stations having a range measurement between a base station NLOS with a mobile station have a significantly larger number of greatest absolute residual differences than the number of greatest absolute residual differences from other base stations. From the value of the counted number of residual differences, base station 14 can be defined as a base station 12 that is a LOS or a base station 12 that is NLOS with mobile station 14.

Figure 6:
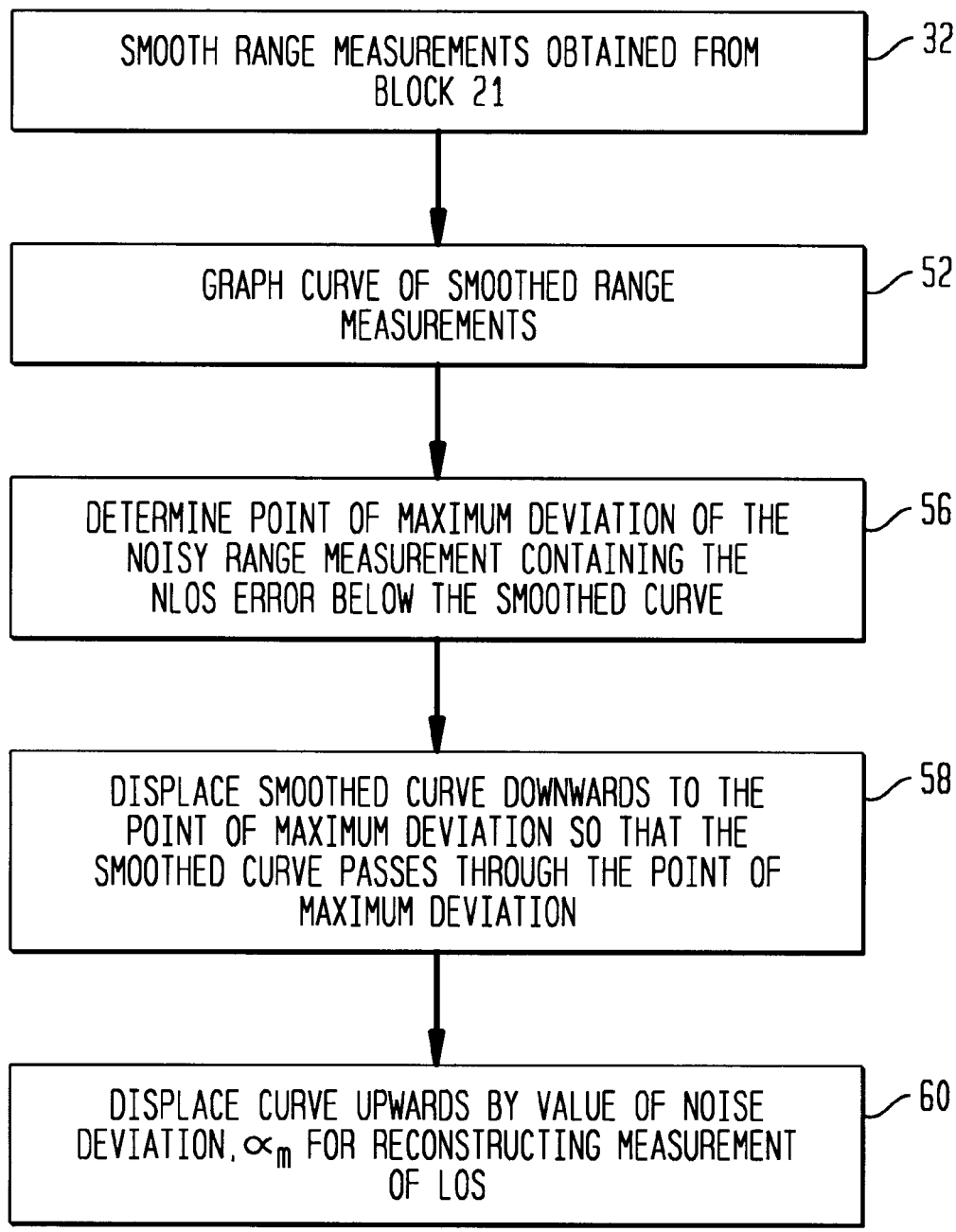
FIG. 6 is a flow diagram of a method for reconstructing a line of sight base station for non-line of sight measurements.

FIG. 6 illustrates a method for correction of range measurements between a base station 12 that has been determined NLOS with mobile station 14 to reconstruct a LOS range measurement. Data related to the range measurements from block 21 are smoothed using an $N^{th}$ order polynomial fit described in block 32. The smooth range measurements are inputted to block 52. The maximum deviation below the smoothed curve due to NLOS error in determined in block 56. It has been found that NLOS error is a non-negative random variable which can be approximately represented in a real axis as follows:

$$O \leq NLOSm(t_i) \leq \beta m$$

in which $\beta m$ is the maximum value of NLOS error. The standard measurement noise, $n_m(t_i)$ can be represented as a zero-mean random variable which can be approximately represented in a real axis as follows: $-\alpha_m \leq n_m(t_i) \leq \alpha_m$, so that in a range measurement in which there is also an NLOS error, the total noise component can be approximated represented over the real axis as follows:

$$-\alpha_m \leq n_m(t) + NLOS_m(t) \leq \beta_m - \alpha_m$$

It has been found that the point of maximum deviation of the measured range below the smoothed curve is about $\alpha_m$ below the LOS function represented as $L_m(t_i)$. In block 58, the smoothed curve is displaced mathematically downward to the point of maximum deviation. The smoothed curve is displaced mathematically upward by a value of the noise deviation $\alpha_m$ in block 60 to provide a reconstructed curve representing a reconstructed LOS base station.

Figure 7:
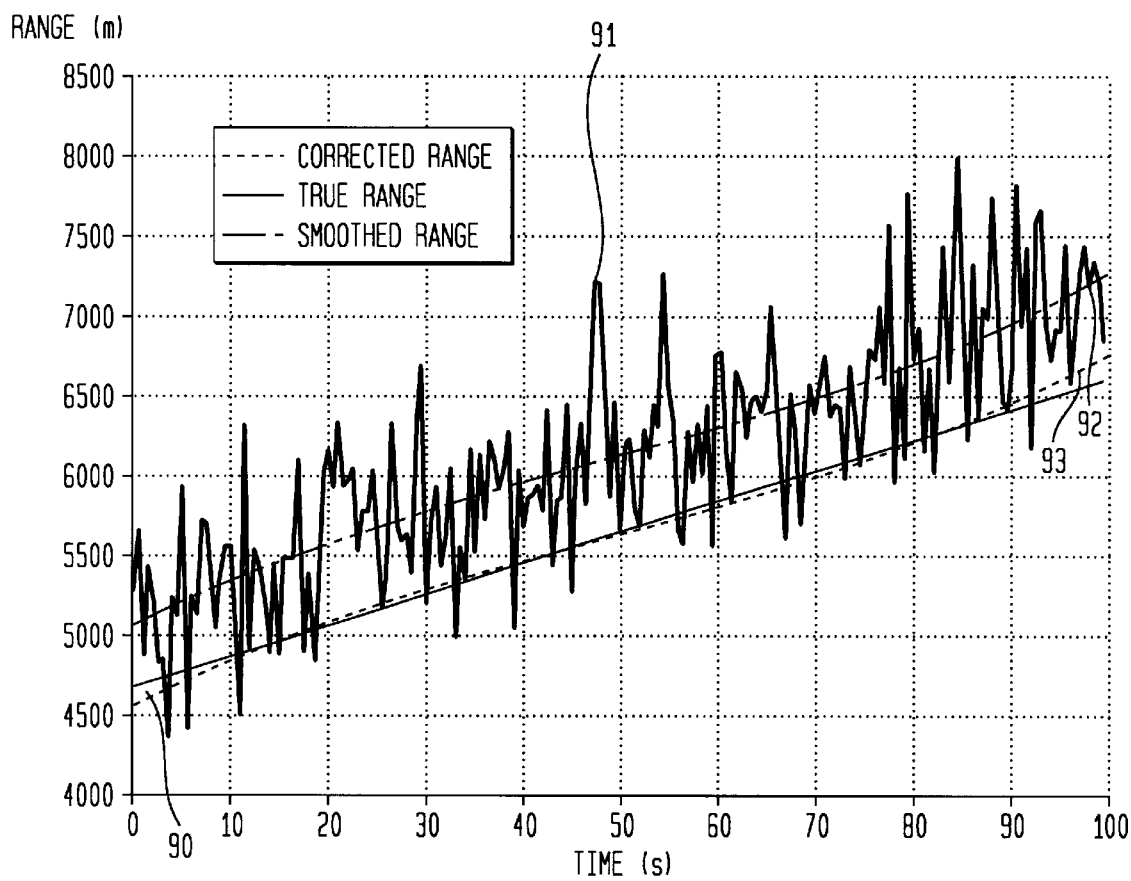
FIG. 7 is a graph of a comparison of NLOS measurements and reconstructed LOS measurements.

FIG. 7 represents a graph of a comparison of simulated range measurements. Curve 90 represents the true time range measurement between a base station 12 which is LOS with a mobile station 14. Curve 91 represents determined range measurements having NLOS error. Curve 92 represents a smoothed range measurement of block station 12 and mobile station 14 determined from block 30 of FIG. 4. Curve 93 represents base station 12 which is reconstructed LOS with the mobile station 14 from block 60 of FIG. 6.

Figure 8:
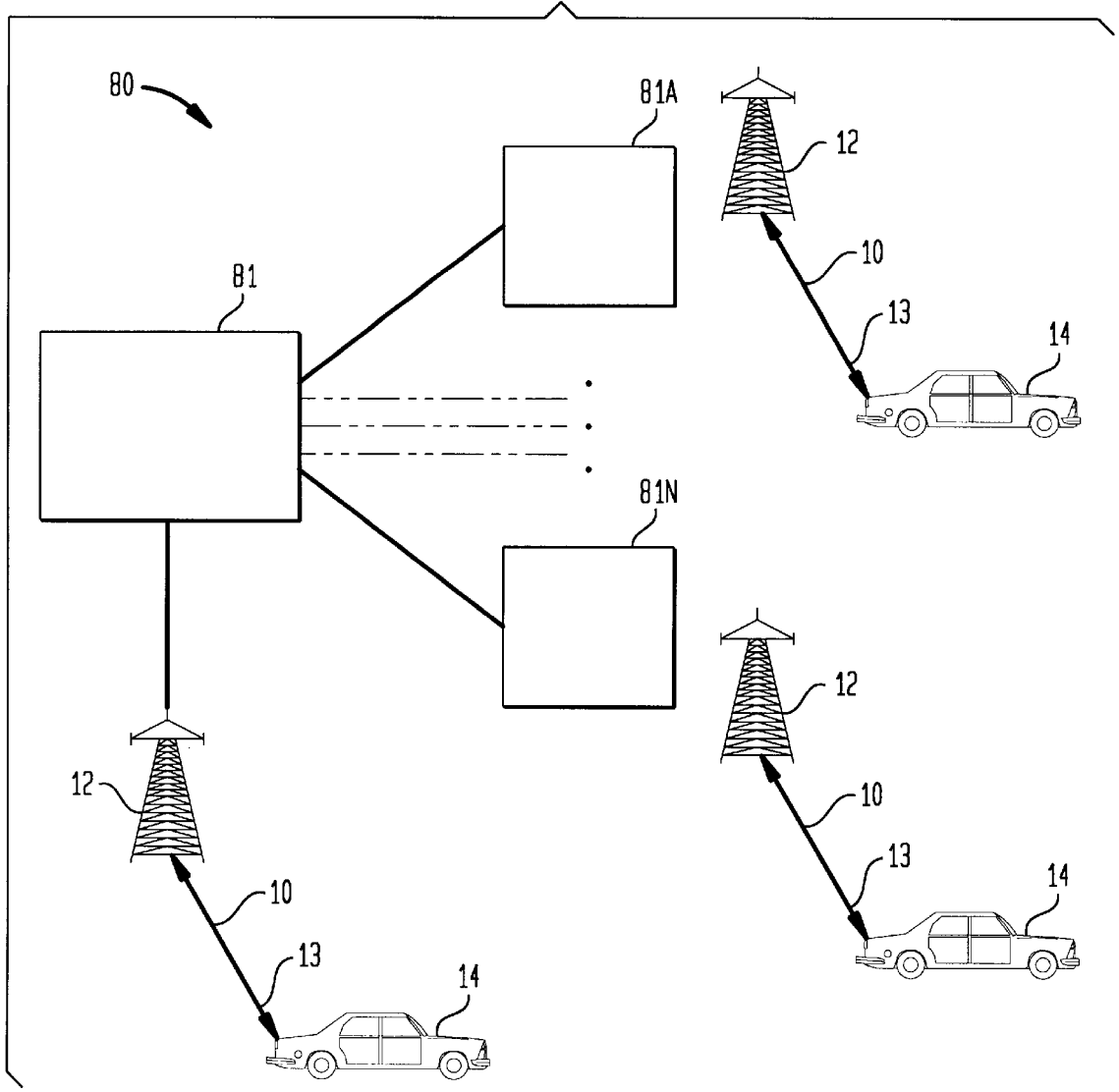
FIG. 8 is a schematic diagram of a system for implementing the method of the present invention.

FIG. 8 is a schematic diagram of a system 80 for implementing the method for mobile location estimation. System 80 includes base station server 81. Base station server 81 can be a computer located at base station 12 or networked thereto. Base station server 81 communicates with base station 12 for requesting and receiving data related to range measurements of mobile station 14 and base station 12. Base station server 81 also collects information on range measurements between mobile station 14 and each of base stations 81A–81N. The information is reported to base station server 81 either by mobile station 14 or base station servers 81A–81N. The functions of modules shown in FIGS. 4–6 which are coded with a standard programming language, such as C++ programming language. The coded modules can be executed by base station server 81.

Results for examples of mobile location estimates with system 80 are shown in Tables I–IV and FIG. 9 through FIG. 12. In all of the examples, the vehicle's position in the x-y plane at any is given by:

$$x(t) = X_o + V_x t$$

$$y(t) = Y_o + V_y t$$

x(t) represents the x-coordinate in x-y plane at time instant, t, y(t) represents the y-coordinate in x-y plane at time instant, t, $x_o$ represents the initial x-coordinate, $y_o$ represents the initial y-coordinate, $v_x$ represents the speed in x-direction, $v_y$ represents the speed in y-direction.

Figure 9:
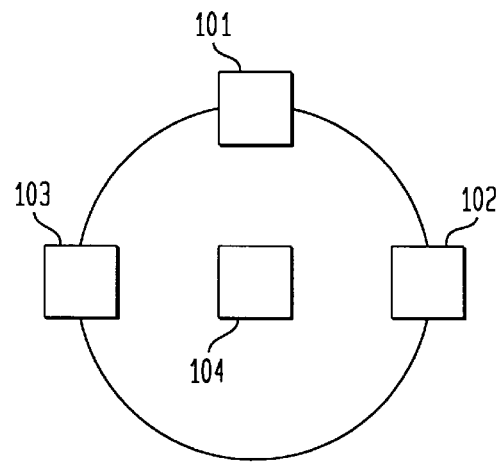
FIG. 9 is a schematic diagram of positioning of base stations used in examples of performance of the method of the present invention.

The sampling period was chosen to be 0.5s and 200 samples were taken. The velocity remained constant at $v_x$=9.7 m/s and $v_y$=16.8 m/s. Base stations 12 were assigned to have NLOS or LOS range measurements. Standard deviation of the standard measurement noise was represented as a om was 150 m and Bm was chosen as 1300 m. In each example three base stations 101, 102, 103 were used uniformly spaced around a circle of 5 kilometers and a fourth base station 104 was located at the center of the circle, as shown in FIG. 9.

In a first example, base station 101 and base station 102 provide NLOS range measurements and base stations 103 and base station 104 provide LOS range measurements. The standard deviation $\hat{\sigma}_m$ (m) of the smoothed curve determined in FIG. 4 is shown in Table 1.

TABLE 1

STANDARD DEVIATION OF MEASUREMENTS FROM SMOOTHED CURVE FOR 2 NLOS MEASUREMENTS

| Base | NLOS | $\hat{\sigma}_m$ (m) |
|------|------|----------------------|
| 101  | Yes  | 467.3                |
| 102  | Yes  | 447.6                |
| 103  | No   | 163.1                |
| 104  | No   | 142.1                |

The results indicate base stations 101 and 102 have NLOS range measurements with a significantly larger standard deviation than base station 103 and base station 104 having a LOS range measurement.

Figure 10A:
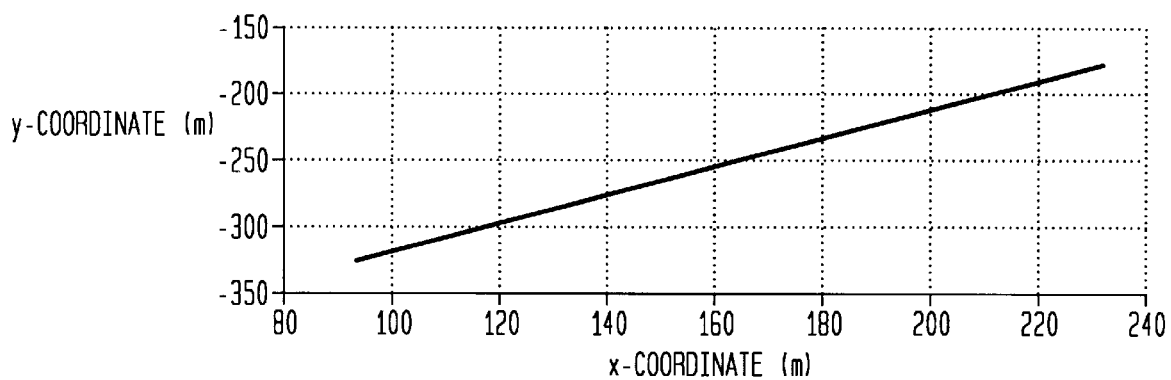
FIG. 10A is a graph of two dimensional tracking without non line of sight error detection and correction.
Figure 10B:
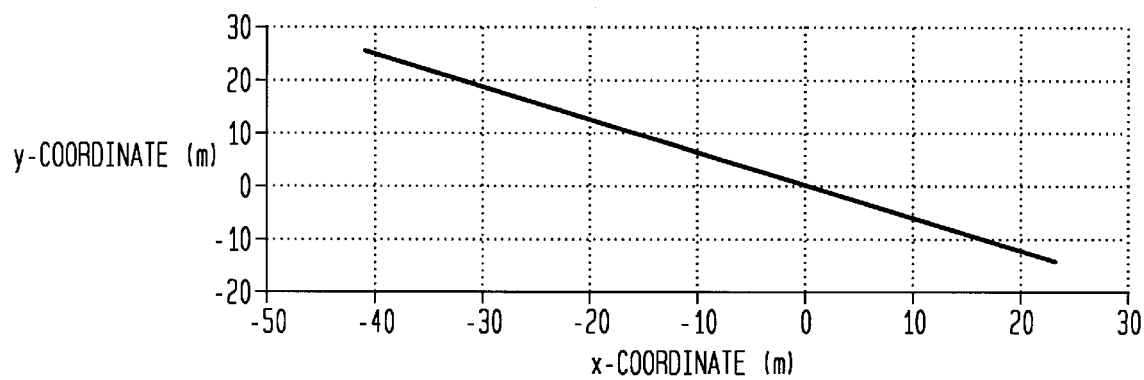
FIG. 10B is a graph of two dimensional tracking with non line of sight error detection and correction.
Figure 11A:
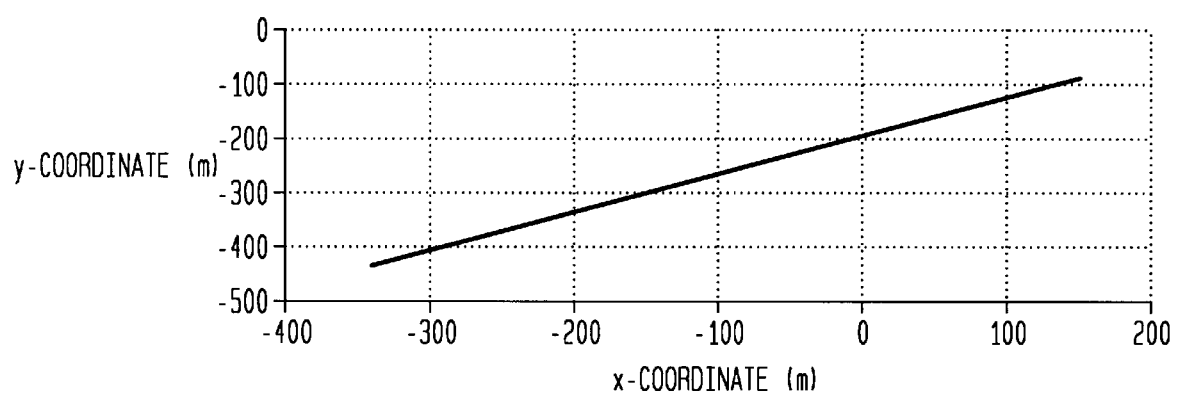
FIG. 11A is a graph of two dimensional tracking without non line of sight error detection and correction.
Figure 11B:
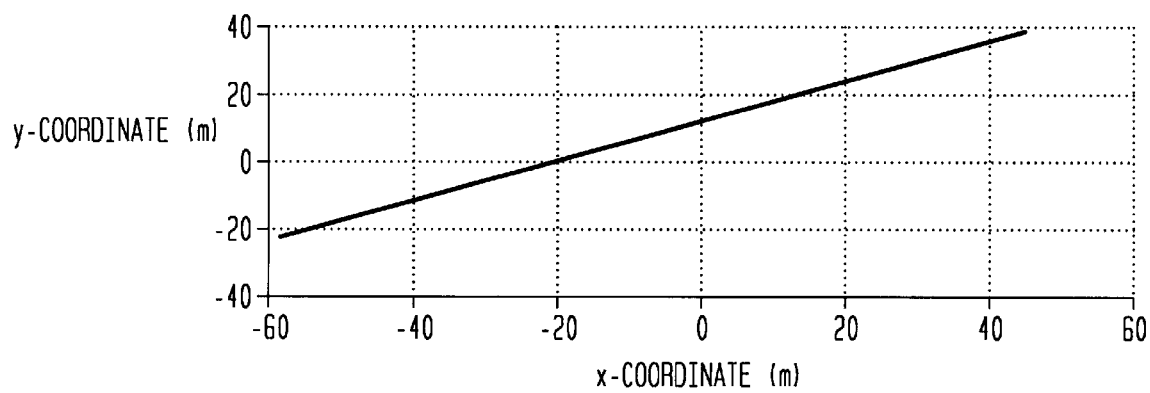
FIG. 11B is a graph of two dimensional tracking with non line of sight error detection and correction.

FIG. 10A shows two-dimensional tracking error without NLOS identification and correction FIG. 10B shows two dimensional tracking error after the method of mobile location estimation of the present invention is performed. The results indicate improvement of estimated vehicle trajectory after NLOS identification and correction.

In a second example, base stations 101, 102, 103 and 104 have NLOS range measurements. The standard deviation $\hat{\sigma}_m$ (m) of the smoothed curve determined in FIG. 4 is shown in Table 2.

TABLE 2

STANDARD DEVIATION OF MEASUREMENTS FROM SMOOTHED CURVE FOR FOUR NLOS MEASUREMENTS

| Base | NLOS | $\hat{\sigma}_m$ (m) |
|------|------|----------------------|
| 101  | Yes  | 440.2                |
| 102  | Yes  | 444.4                |
| 103  | Yes  | 463.6                |
| 104  | Yes  | 450.2                |

The results indicate a similar standard deviation $\hat{\sigma}(m)$ for all four base stations 101, 102, 103 and 104 having NLOS.

Figure 5:
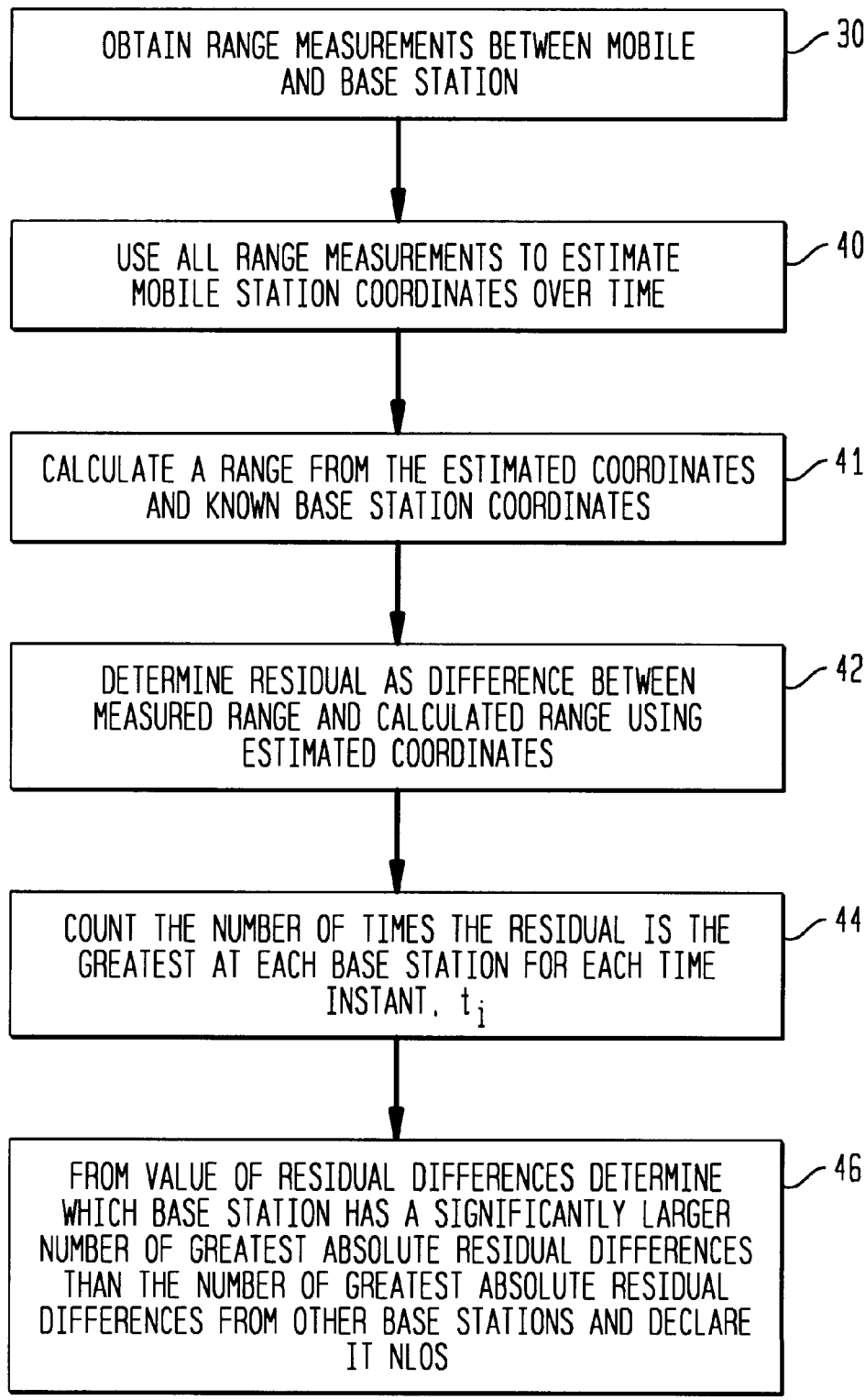
FIG. 5 is a flow diagram of an alternate method for identifying non-line of sight base stations.

In a third example, three results were determined using $x_o$=−118.3 m $y_o$=−3.7 m with the residual analysis tracking method shown in FIG. 5. In test 1, base station 104 was NLOS. In test 2, base station 103 and base station 104 are NLOS. In test 3, base station 102, base station 103 and base station 104 were non-line of sight. The number of times each base station had the largest absolute residual difference is shown in Table 3.

TABLE 3

PERCENTAGE OF TIME BS HAD LARGEST RESIDUAL

| TEST | | BS101 | BS102 | BS103 | BS104 |
|------|------|-------|-------|-------|-------|
| 1 | LOS  | 10    | 11    | 18.5  |       |
|   | NLOS |       |       |       | 60    |
| 2 | LOS  | 18.5  | 15    |       |       |
|   | NLOS |       |       | 26.5  | 40    |
| 3 | LOS  | 12.5  |       |       |       |
|   | NLOS |       | 20    | 40.5  | 27    |

The results indicate NLOS base stations having larger percentages of residual differences.

In a fourth example, results of the method for location estimation at the present invention were compared with a conventional least square analysis, a least square analysis with all range measurements are line of sight and a conventional Cramer Rao Lower Bound analysis. The Cramer Rao Lower Bound represents a lower bound on the rms error of any unbiased estimator. Table 4 represents the present method shown in column 2, the conventional least squares analysis shown in column 1, a least square analysis with all measurements LOS in column 3 and the conventional Cramer Rao Lower Bound analysis shown in column 4. The location and speed errors in each coordinates were measured in meters and meters/second respectively.

$\mu_{xo}$ = mean error in estimating $x_o$   $\sigma_{xo}$ = standard deviation of $\hat{x}_o$
$\mu_{yo}$ = mean error in estimating $y_o$   $\sigma_{yo}$ = standard deviation of $\hat{y}_o$
$\mu_{vx}$ = mean error in estimating $v_x$   $\sigma_{vo}$ = standard deviation of $\hat{v}_x$
$\mu_{vy}$ = mean error in estimating $v_y$   $\sigma_{vy}$ = standard deviation of $\hat{v}_y$

TABLE 4

COMPARISON OF ESTIMATOR PERFORMANCE

| | LEAST SQUARES PRIOR ART METHOD | METHOD OF PRESENT INVENTION | LOS | $\sqrt{CRLB}$ |
|---|---|---|---|---|
| $\mu_{xo}$ | 297.8 | −3.98 | 0.17 | — |
| $\sigma_{xo}$ | 32.9 | 28.30 | 16.42 | 15.88 |
| $\mu_{yo}$ | −306.1 | −2.36 | 0.54 | — |
| $\sigma_{yo}$ | 55.5 | 45.13 | 14.15 | 14.18 |
| $\mu_{vx}$ | 0.18 | −0.09 | −0.005 | — |
| $\sigma_{vx}$ | 0.55 | 0.49 | 0.27 | 0.27 |
| $\mu_{vy}$ | 4.49 | −.01 | −0.005 | — |
| $\sigma_{vy}$ | 0.84 | 0.64 | 0.25 | 0.25 |

The results indicate that the mobile location estimation method of the present invention significantly reduced the estimation bias as compared to results without NLOS error correction.

Figure 12:
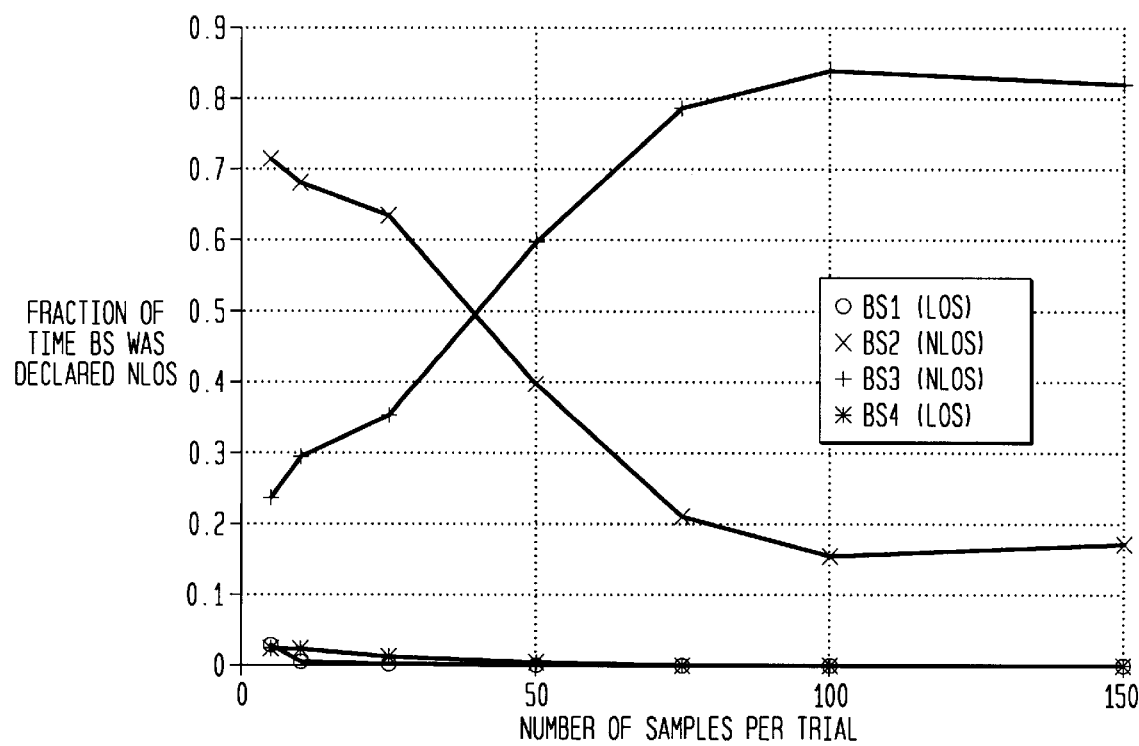
FIG. 12 is a graph of the fraction of time a base station was declared NLOS using the residual rank analysis method.

FIG. 12 is a comparison of the probability of detecting an NLOS range measurement. The sampling period was 0.5 seconds. The number of samples varied between 5 and 150. $X_o$ was 200 m and $y_o$ was 100 m. Base station 101 and base station 104 were LOS. Base station 102 and base station 103 were NLOS. The results indicate NLOS can be detected with high probability for a small number of samples.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

We claim:

1. A method for mobile station location estimation comprising the steps of:
   a. obtaining range measurements between said mobile station and a base station;
   b. identifying whether said base station is line of sight with said mobile station or non-line of sight with said mobile station at the time at which a mobile location estimate is made by comparing a first standard deviation of said range measurements with a second standard deviation of noisy line of sight range measurements;
   c. correcting non-line of sight range measurements for a base station identified as non-line of sight with said mobile station in step b to determine reconstructed line of sight range measurements;
   d. repeating steps a through c for a predetermined number of said base stations; and
   e. determining said mobile station location estimation from said reconstructed line of sight range measurements determined in step c or said range measurements determined in step a for an identified line of sight base station in step b, or the combination of said reconstructed line of sight range measurements determined in step c, and said range measurements determined in step a for an identified line of sight base station in step b.

2. The method of claim 1 wherein said steps a through c are repeated for at least two base stations and further comprising the step of determining angle arrival information,
   wherein said mobile station location is estimated from range measurements or reconstructed line of sight range measurements of said two base stations and said angle arrival information.

3. The method of claim 1 wherein steps a through c are repeated for three base stations.

4. A method for mobile station location estimation comprising the steps of:
   a. obtaining range measurements between said mobile station and a base station;
   b. identifying whether said base station is line of sight with said mobile station or non-line of sight with said mobile station at the time at which a mobile location estimate is made comprising the steps of:
      obtaining line of sight range measurements between said mobile station and a base station without noise;
      obtaining noisy line of sight range measurements between said mobile station and said base station;
      predetermining a first standard deviation of the difference of said line of sight range measurements with said noisy line of sight range measurements;
      smoothing said range measurements determined in step a;
      determining a second standard deviation of the difference between said smoothed range measurements and said noisy line of sight range measurements; and
      discriminating between said base station being line of sight or said base station being non-line of sight from said first standard deviation and said second standard deviation, said base station is determined to be non-line of sight when said second standard deviation is greater than said first standard deviation and line of sight when said second standard deviation is on the order of said first standard deviation;
   c. correcting non-line of sight range measurements for a base station identified as non-line of sight with said mobile station in step b to determine reconstructed line of sight range measurements;
   d. repeating steps a through c for a predetermined number of said base stations; and
   e. determining said mobile station location estimation from said reconstructed line of sight range measurements determined in step c or said range measurements determined in step a for an identified line of sight base station in step b, or the combination of said reconstructed line of sight range measurements determined in step c, and said range measurements determined in step a for an identified line of sight base station in step b.

5. The method of claim 4 wherein the range measurement obtained in step a is represented by:

$$r_m(t_i) = L_m(t_i) + n_m(t_i) + NLOS_m(t_i)$$

for m=1, . . . , M i=0, . . . K−1, wherein
   $L_m(t_i)$ is the LOS distance between a mobile station and the $m^{th}$ base station in two dimensions which is given by:

$$L_m(t_i)=|x(t_i)+j*y(t_i)-x_m-j*y_m|;$$

$j=\sqrt{\sqrt{-1}}$, $\|$ is absolute value, $x(t_i)$, $y(t_i)$ and $(x_m, y_m)$ are respectively the coordinates of the mobile station at time, $t_i$, and those of the $m^{th}$ base station; $n_m(t_i)$ represents conventional measurement noise such as additive white Gaussian measurement noise and $NLOS_m(t_i)$ represents NLOS measurement error at time $t_i$; and M is the total number of base stations; and K is the total number of time samples.

6. The method of claim 5 where the range measurement is smoothed by modeling:

$$r_m(t_i) = \sum_{n=0}^{N-1} a_m(n)t_i^n$$

and solving for the unknown coefficients, $\{a_m(n)\}_{n=}^{N-1}$ with a least squares technique.

7. The method of claim 6 wherein the second standard deviation is represented by $$\hat{\sigma}_m = \sqrt{\frac{1}{K}\sum_{i=0}^{K-1}(s_m(t_i) - r_m(t_i))^2}$$

wherein $$s_m(t_i) = \sum_{n=0}^{N-1} \hat{a}_m(n)t_i^n.$$

8. A method for mobile station location estimation comprising the steps of:
   a. obtaining range measurements between said mobile station and a base station;
   b. identifying whether said base station is line of sight with said mobile station or non-line of sight with said mobile station at the time at which a mobile location estimate is made comprising the steps of:
      estimating coordinates of said mobile station from said range measurement obtained in step a over time;
      calculating a range measurement from said estimated coordinates;
      determining a residual from the difference of said range measurement obtained in step a and said calculated range measurement;
      counting the number of times the residual is the greatest at each base station for each time instant; and
      defining said base station as non-line of sight from the base station which has the greatest value of the number of times the greatest residual was counted;
   c. correcting non-line of sight range measurements for a base station identified as non-line of sight with said mobile station in step b to determine reconstructed line of sight range measurements;
   d. repeating steps a through c for a predetermined number of said base stations; and
   e. determining said mobile station location estimation from said reconstructed line of sight range measurements determined in step c or said range measurements determined in step a for an identified line of sight base station in step b, or the combination of said reconstructed line of sight range measurements determined in step c, and said range measurements determined in step a for an identified line of sight base station in step b.

9. The method of claim 8 wherein said estimated coordinates are represented by
$\hat{x}_{LS}(t_i)$, $\hat{y}_{LS}(t_i)$ at each instance of time $t_i$, said estimated coordinates are determined as least squares estimates to $$F_i = \sum_{m=1}^{M}(r_m(t_i) - \hat{L}_m(t_i))^2$$

where $\hat{L}_m(t_i)=|\hat{x}(t_i)-x_m+j*\hat{y}(t_i)-j*y_m|$.

10. A method for mobile station location estimation comprising the steps of:
   a. obtaining range measurements between said mobile station and a base station;
   b. identifying whether said base station is line of sight with said mobile station or non-line of sight with said mobile station at the time at which a mobile location estimate is made comprising the steps of:
      determining a value of maximum noise deviation and standard deviation from said range measurements obtained in step a and a predetermined line of sight range measurement with negligible noise;
      smoothing said range measurements obtained from step a;
      graphing a curve of said smoothed range measurements;
      determining a point of maximum deviation of said range measurement below said curve;
      displacing said curve downwards to pass through said point of maximum deviation; and
      displacing said curve upwards by said value of said maximum noise deviation, thereby providing said reconstructed range measurement;
   c. correcting non-line of sight range measurements for a base station identified as non-line of sight with said mobile station in step b to determine reconstructed line of sight range measurements;
   d. repeating steps a through c for a predetermined number of said base stations; and
   e. determining said mobile station location estimation from said reconstructed line of sight range measurements determined in step c or said range measurements determined in step a for an identified line of sight base station in step b, or the combination of said reconstructed line of sight range measurements determined in step c, and said range measurements determined in step a for an identified line of sight base station in step b.

11. A system for mobile station location estimation comprising:
   means for obtaining range measurements between said mobile station and a plurality of base stations;
   identifying means for identifying whether each of said base stations is line of sight with said mobile station as a line of sight base station or non-line of sight with said mobile station as a non-line of sight base station;
   said identifying means comprising:
      means for obtaining a line of sight range measurement without noise between said mobile station and each of said base station;
      means for obtaining a noisy line of sight range measurement between said mobile station and each of said base station;
      means for predetermining a first standard deviation of the difference of said line of sight range measurement with said noisy line of sight range measurements;

means for smoothing said range measurements;

means for determining a second standard deviation of the difference between said smoothed range measurements and said noisy line of sight range measurement; and means for discriminating each of said base stations as being line of sight or being non-line of sight from said first standard deviation and said second standard deviation, said base station is determined to be non-line of sight when said second standard deviation is significantly greater than said first standard deviation and line of sight when said second standard deviation is on the order of said first standard deviation;

correcting means for correcting said range measurement for each of said non-line of sight base stations to determine a reconstructed line of sight range measurement; and estimating means for determining said mobile station location estimation from said reconstructed line of sight range measurements or said range measurements for said line of sight base station, or the combination of said reconstructed line of sight range measurements, and said range measurements for said line of sight base stations.

12. The system of claim 11 wherein the range measurement is represented by:

$$r_m(t_i) = L_m(t_i) + n_m(t_i) + NLOS_m(t_i)$$

for m=1, ..., M i=0, ... K-1, wherein $L_m(t_i)$ is the LOS distance between a mobile station and the $m^{th}$ base station in two dimensions which is given by:

$$L_m(t_i) = |x(t_i) + j*y(t_i) - x_m - j*y_m|;$$

$j = \hat{\sqrt{-1}}$, $\|$ is absolute value, $x(t_i)$, $y(t_i)$ and $(x_m, y_m)$ are respectively the coordinates of the mobile station at time, $t_i$, and those of the $m^{th}$ base station; $n_m(t_i)$ represents conventional measurement noise such as additive white Gaussian measurement noise and $NLOS_m(t_i)$ represents NLOS measurement error at time $t_i$; and M is the total number of base stations; and K is the total number of time samples.

13. The system of claim 12 where the range measurement is smoothed by modeling:

$$r_m(t_i) = \sum_{n=0}^{N-1} a_m(n) t_i^n$$

and solving for the unknown coefficients, $\{a_m(n)\}_{n=0}^{N-1}$ with a least squares technique.

14. The system of claim 13 wherein the second standard deviation is represented by $$\hat{\sigma}_m = \sqrt{\frac{1}{K} \sum_{i=0}^{K-1} (s_m(t_i) - r_m(t_i))^2}$$

wherein $$s_m(t_i) = \sum_{n=0}^{N-1} \hat{a}_m(n) t_i^n.$$

15. The system of claim 13 wherein said estimated coordinates are represented by $\hat{x}_{LS}(t_i)$, $\hat{y}_{LS}(t_i)$ at each instance of time $t_i$, said estimated coordinates are determined as least squares estimates to $$F_i = \sum_{m=1}^{M} (r_m(t_i) - \hat{L}_m(t_i))^2$$

where $\hat{L}_m(t_i) = |\hat{x}(t_i) - x_m + j*\hat{y}(t_i) - j*y_m|$.

16. The system of claim 11 wherein said estimating means comprises:

means for determining a value of maximum noise deviation standard deviation for each of said range measurements and a predetermined line of sight range measurement with negligible noise;

means for smoothing said range measurements;

means for graphing a curve of said smoothed range measurements;

means for determining a point of maximum deviation of said range measurements below said curve;

means for displacing said curve downwards to pass through said point of maximum deviation; and means for displacing said curve upwards by said value of said maximum noise deviation, thereby providing said reconstructed range measurement.

17. The system of claim 11 further comprises means for obtaining angle arrival information wherein said mobile station location is estimated from range measurements or reconstructed line of sight range measurement of said base stations and said angle arrival information.

18. A system for mobile station location estimation comprising:

means for obtaining range measurements between said mobile station and a plurality of base stations;

identifying means for identifying whether each of said base stations is line of sight with said mobile station as a line of sight base station or non-line of sight with said mobile station as a non-line of sight base station;

said identifying means comprises:

means for estimating coordinates of said mobile station from said range measurements from a plurality of base stations received over time;

means for calculating a calculated range measurement from said estimated coordinates;

means for determining a residual from the difference of said range measurements and said calculated range measurement;

means for counting the number of times the residual is the greatest at each base station for each time instant; and means for defining said base station as non-line of sight from the base station which has the greatest value of the number of times the greatest residual was counted;

correcting means for correcting said range measurement for each of said non-line of sight base stations to determine a reconstructed line of sight range measurement; and estimating means for determining said mobile station location estimation from said reconstructed line of sight range measurements or said range measurements for said line of sight base station, or the combination of said reconstructed line of sight range measurements, and said range measurements for said line of sight base stations.

* * * * *